March 14, 1967   C. E. SCHEFFLER   3,308,910
INTERNAL SHOE BRAKE
Filed June 4, 1965

CLARENCE E. SCHEFFLER
INVENTOR

BY *John R. Faulkner*
*Clifford L. Sadler*
ATTORNEY

United States Patent Office 3,308,910
Patented Mar. 14, 1967

3,308,910
INTERNAL SHOE BRAKE
Clarence E. Scheffler, Port Huron, Mich., assignor to Ford Motor Company, Dearborn, Mich., a corporation of Delaware
Filed June 4, 1965, Ser. No. 461,469
8 Claims. (Cl. 188—79.5)

The present invention relates generally to motor vehicle brakes, and more particularly to an internal shoe brake having automatic means to compensate for brake lining wear.

It has long been appreciated in the automotive brake field that automatic means for compensating for brake lining wear are highly desirable. The brake art is crowded with evidence of the efforts expended to develop a commercially successful automatic brake adjuster. A majority of the designs are objectionable because of excessive cost and mechanical unreliability. Overadjustment is another common fault.

In view of the state of the art, it is the principal object of the present invention to provide an automatic adjuster for internal shoe automotive brakes that is characterized by simplicity and reliability. The invention of the present patent application is an improvement of the invention disclosed and described in Patent 3,150,746 issued to Robert J. Rumpf.

More specifically, it is an object of the present invention to provide an embodiment in which a pair of arcuate brake shoes are secured to a brake backing plate and have a pair of adjacent upper ends that are in engagement with an anchor pin. The brake shoes have a pair of adjacent lower ends that are in engagement with an intermediate ratchet wheel. The ratchet wheel has a step cam configuration and is spring pressed to control the minimum separation of the lower shoe ends.

An appropriately placed retractor spring holds the upper shoe ends in engagement with the anchor pin so that when a hydraulic cylinder adjacent to the anchor pin is actuated, the shoes will pivot about the anchor pin and separate at their lower ends. The separation will continue until the shoes touch the brake drum. If the separation is excessive, indicating brake lining wear, the ratchet wheel will rotate to reduce the amount the shoes will be retracted when the hydraulic cylinder is deactivated and hence will reduce the minimum clearance of the shoes and the drum when the brake is at an at-rest state.

The brake adjustment caused by the rotation of the ratchet wheel will occur only during the initial stage of brake application when the brake is under a no-load condition. Once the shoes touch the brake drum servo action will cause the upper end of the primary brake shoe to leave the anchor pin and close the separation between the lower ends.

The advantages of an automatic brake adjuster constructed in accordance with this invention will become amply apparent from the following description and the accompanying drawings in which.

Figure 1:
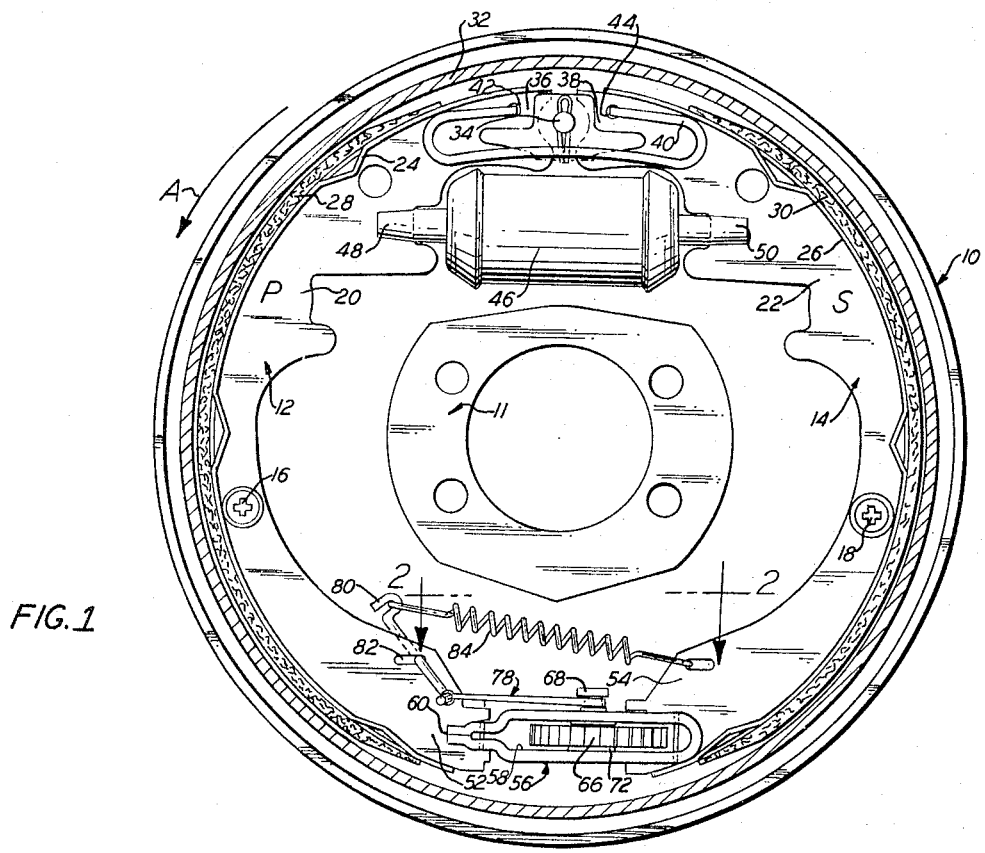
FIGURE 1 is an elevational view of a vehicle brake incorporating a novel adjuster mechanism.

Referring now to the drawings for a more detailed understanding of this invention, a vehicle brake assembly 10 is shown in FIGURE 1. The brake assembly 10 comprises a brake backing plate 11 to which primary and secondary brake shoes 12 and 14 are secured by means of steady rest springs 16 and 18. The brake shoes 12 and 14 are of arcuate configuration and have web portions 20 and 22, respectively, that lie in a plane parallel to the plane of the backing plate 11. An arcuate shoe rim 24 is welded or otherwise secured to the outer edge of the web 20. Similarly, an arcuate rim 26 is secured to the outer edge of the web 22 for the secondary shoe 14. Arcuate brake linings 28 and 30 are secured to the rims 24 and 26, respectively.

A cylindrical brake drum 32 is positioned in spaced relation to the brake linings 28 and 30 and is adapted to rotate in the direction of the arrow A when the vehicle having the brake assembly 10 is moving in a forward direction.

An anchor pin 34 is rigidly secured to the backing plate 11. The upper ends 36 and 38 of the shoe webs 20 and 22 engage the anchor pin 34. These web ends are held in engagement with the anchor pin by a retractor spring 40. The spring 40 has a generally C-shaped body portion with a pair of prong ends that extend normal to the plane of the body portion. Holes 42 and 44 are provided in the shoe web and receive the ends of the spring 40. The holes 42 and 44 are in substantial alignment with the anchor pin 34. The construction of the C-shaped spring 40 and is relationship to the ends of the brake shoe and the anchor pin are more fully described in patent application Ser. No. 318,981 filed Oct. 25, 1963 by John V. Barnes and entitled, Non-Helical Spring for Internal Shoe Brakes. This application has now issued as Patent No. 3,204,729 and is assigned to the same assignee as the present application.

A hydraulic wheel cylinder 46 is secured to the brake backing plate and has thrust links 48 and 50 which extend from its ends into engagement with the webs 20 and 22 of the shoes 12 and 14. The wheel cylinder 46 receives hydraulic fluid from a pressure source such as a brake master cylinder or a power brake booster and is adapted to press the links 48 and 50 outwardly to cause the shoe linings 28 and 30 into engagement with the brake drum 32.

The webs of the brake shoes 12, 14 are provided with adjacent lower ends 52 and 54 and an automatic adjuster means is interposed between those ends. A sheet metal retainer 56 is formed from a strip of sheet metal that is folded over so as to provide an elongated inner opening 58. The two ends are welded together at 60. A slot 62 is formed in one end of the retainer 56 and extends in a direction normal to the plane of the opening 58. Similarly, a slot 64 is formed in the opposite end of the retainer 56. A step cam or ratchet wheel 66 is fitted within the slot 58. A short shaft 68 extends through aligned openings 70 and 72 in the sides of the retainer 56 and engages a central opening 74 in the step cam 66. There is a driving connection between shaft 68 and the step cam 66 which is positioned within the slot 58 of the retainer 56.

The assembly comprising the retainer 56, step cam 66 and shaft 68 is positioned between the opposed ends of the webs 52 and 54. Web 52 is provided with an inset portion that fits within the slot 62. Web 54 is similarly provided with an inset portion which fits within the slot 64.

The step cam 66 has a progressively increasing radius. The distance between the depth of the slot 64 and the center of the shaft 68 is less than the distance between the center of the hole 74 and the depth of the first notch or step 76 of the surface of the cam 66. Therefore, when the adjuster assembly is interposed between the ends of the webs 20 and 22, the end 54 of the secondary shoe web rests against the periphery of the step cam 66 rather than the depth of the slot 64.

A thin flexible band of metal 68 is connected to the extending end of the shaft 68 and is wound around said end. The opposite end of the band 78 is connected to a rocking lever 80. The lever 80 extends through a slot 82 in the web 20 which functions as a fulcrum for the lever 80. The lower end of the rocking lever 80 is connected to the end of the band 78. The upper end of the lever 80 is connected to one end of a return spring 84. The opposite end of the return spring 84 is joined to the web 22 of the secondary shoe 14.

*Operation*

Figure 2:
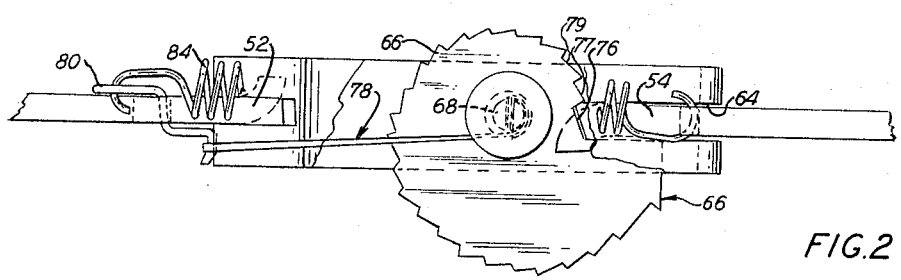
FIGURE 2 is a sectional view taken along section lines 2—2 of FIGURE 1.
Figure 3:
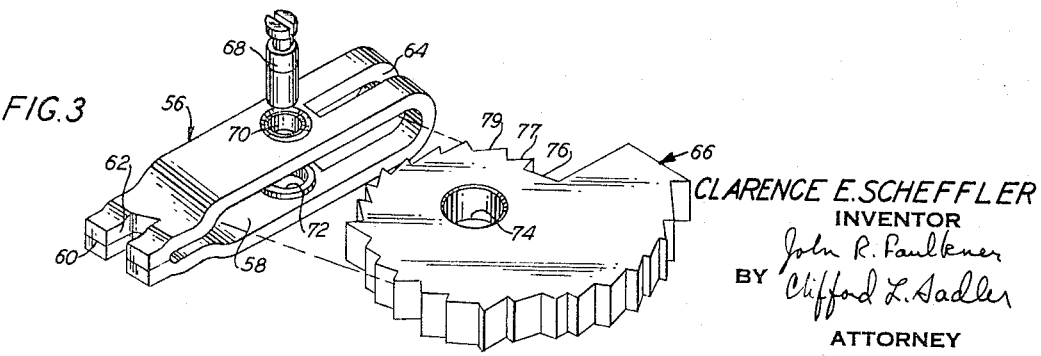
FIGURE 3 is an exploded view in perspective of the ratchet wheel and the wheel retainer.

The spring 82 exerts a force on the lever 80 which tends to turn it in a clockwise direction as viewed in FIGURE 1. This urges the band 78 to the left in a direction to unwind its connection with the shaft 68. This force, in turn, tends to rotate the step cam in a clockwise direction (as viewed in FIGURE 2). The cam 68 is prevented from turning in a clockwise direction by the engagement of the first tooth 77 adjacent to the notch 76 with the edge of the web end 54. The spring 84, in addition to exerting a force tending to rotate the step cam 66, also exerts a force tending to draw the web ends 52 and 54 together and into engagement with the automatic brake adjuster mechanism.

When the hydraulic wheel cylinder 46 is activated, the actuator links 48 and 50 will be extended outwardly and press against the primary and secondary shoes 12 and 14. Due to the pressure of the return spring 40, the shoes will remain in engagement at their upper ends with the anchor pin 34 and will separate at their lower ends. The location and strength of the upper retractor spring 40 is designed to hold the web ends 36 and 38 in engagement with an anchor pin 34 until the brake linings 28 and 30 come into contact with the brake drum 32. This is contrary to the conventional duo-servo brake in which the brake shoe ends separate from the anchor pin prior to engagement with the brake drum.

When the wheel cylinder 46 is actuated, the web end 52 will move outwardly in the slot 64 away from the step cam 66. If the brake linings 28 and 30 have been worn a sufficient amount to cause excessive clearance between the linings and the surface of the brake drum 32, the web end 54 will move outwardly away from the step cam 62, past the tooth 77 adjacent to the notch 76 in which the web normally resides. When the web end 54 moves past the tooth 77, the spring 84 (working through the rocker 80 and band 78) will cause the step cam 66 to move in a clockwise direction (FIGURE 2) until the next tooth 79 comes into engagement with the end of the shoe web 54. The notches and adjacent teeth on the periphery of the step cam 66 are situated at a progressively increasing distance from the center of the hole 74 so that when the step cam 66 is permitted to rotate it will move one notch at a time and come to rest with the next tooth against the end of the web 54.

The retainer 56 is held against the web end 52 of the primary shoe 12 by the load on the band 78 which is imposed by the spring 84. The shaft 68 of the step cam 66 is thus fixed relative to the primary shoe 12. The secondary shoe 14 moves away from the primary shoe 12 during brake application and thus, it also moves away from the step cam 66. When the wear of the brake linings 28 and 30 have reached a point to allow this movement to be beyond a designed amount, a tooth of the cam 66 will pass by the end 54 of the web and the next notch of the cam will move into alignment with the end of the web. This rotation of the cam 66 is caused by the torque developed by the band 58 and spring 84.

As soon as the brake linings 28 and 30 come into engagement with the drum, the shoes 12, 14 will tend to rotate with the drum. This action will draw the lower ends 52, 54 of the shoes together and cause the primary shoe end 36 to move away from the anchor pin 34. At this time, the edge of the web end 54 will be in engagement with the notch of the step cam 66. When the brake is under a static condition the spring 84 will function as a retractor spring pulling the lower ends of the shoes 12, 14 away from the brake drum and into engagement with the automatic adjuster device.

As the cam 66 adjusts in a step-by-step fashion, the band or ribbon 78 will unwrap from the post or shaft 68. This occurs as the shoes 12, 14 are moved outwardly. The unwrapping of the ban 78 causes the rocker 80 to rotate in the web end 52 due to the load of the spring 84. The rotating of the rocker 80 and the moving out of the shoes 12 and 14 are designed so as to keep a near constant length to the spring 84. This assures a near constant load on the band 78 and, therefore, a near constant torque on the cam 66.

In effect, the cam limits the extent to which the brake shoe webs may be retracted toward each other by the spring 84 after a brake application in order to maintain a substantially constant clearance between the linings 28 and 30 and the drum 32.

The foregoing description presents the presently preferred embodiment of this invention. Modifications and alterations may occur to those skilled in the art that will come within the scope and spirit of the following claims.

I claim:

1. A brake assembly having a backing plate and a pair of arcuate brake shoes movably connected to said backing plate;

an annular brake drum rotatably disposed with respect to said brake shoes;

said shoes having first and second adjacent ends;

an anchor secured to said backing plate;

first spring means urging said first ends into engagement with said anchor;

brake applying means adapted to move said shoes into engagement with said drum;

said brake applying means in cooperated with said first spring means being further adapted to separate said second ends by pivotal movement of said shoes about said anchor prior to cause engagement of said shoes with said drum;

a link means interconnecting said second ends;

a shaft rotatably connected to said link means;

a ratchet wheel nonrotatably mounted on said shaft;

said ratchet wheel having a progressively increasing diameter;

said ratchet wheel being adapted to rotate in a plane perpendicular to the plane of rotation of said brake drum;

the second end of said other shoe having a portion engaging the periphery of said ratchet wheel;

second spring means having one end connected to said other shoe;

lever means connected to the other end of said second spring means and to said one shoe;

ribbon means wound around said shaft and connected to said lever;

said second spring means exerting a force through said lever means and said ribbon means to urge said shaft and said ratchet wheel to rotate;

said second spring means also being constructed to urge said other shoe into engagement with said ratchet wheel.

2. A brake assembly having a backing plate and a pair of arcuate brake shoes movably connected to said backing plate;

an annular brake drum rotatably disposed with respect to said brake shoes;

said shoes having first and second adjacent ends;

an anchor secured to said backing plate;

first spring means urging said first ends into engagement with said anchor;

brake applying means adapted to move said shoes into engagement with said drum;

said brake applying means in cooperation with said first spring means being further adapted to separate said second ends by pivotal movement of said shoes about said anchor prior to cause engagement of said shoes
with said drum;
a link means interconnecting said second ends;
a ratchet wheel rotatably connected to said link means;
said ratchet wheel having a progressively increasing
diameter;
said ratchet wheel being adapted to rotate in a plane
perpendicular to the plane of rotation of said brake
drum;
the second end of said other shoe having a portion engaging the periphery of said ratchet wheel;
second spring means having one end connected to said
other shoe;
lever means connected to the other end of said second
spring means and to said one shoe;
ribbon means connected to said lever and to said ratchet
wheel;
said second spring means exerting a force through said
lever means and said ribbon means to urge said
ratchet wheel to rotate;
said second spring means also being constructed to
urge said other shoe into engagement with said ratchet
wheel.

3. A brake assembly having a backing plate and a pair of arcuate brake shoes movably connected to said backing plate;
an annular brake drum rotatably disposed with respect
to said brake shoes;
said brake shoes having first and second adjacent ends;
an anchor secured to said backing plate;
first spring means urging said first ends into engagement
with said anchor;
brake applying means adapted to move said shoes into
engagement with said drum;
said brake applying means in cooperation with said
first spring means being further adapted to separate
said second ends by pivotal movement of said shoes
about said anchor prior to cause engagement of said
shoes with said drum;
a ratchet wheel rotatably connected to one of said
shoes;
said ratchet wheel having a progressively increasing
diameter;
said ratchet wheel being adapted to rotate in a plane
perpendicular to the plane of rotation of said brake
drum;
the second end of said other shoe having a portion engaging the periphery of said ratchet wheel;
second spring means having one end connected to said
other shoe;
means connected to the other end of said second spring
means, to said one shoe and to said ratchet wheel and
constructed to urge said ratchet wheel to rotate;
said second spring means also being constructed to urge
said ratchet wheel to rotate;
said second spring means also being constructed to urge
said other shoe into engagement with said ratchet
wheel.

4. A brake assembly having a backing plate and a pair of arcuate brake shoes movably connected to said backing plate;
an annular brake drum rotatably disposed with respect
to said brake shoes;
said brake shoes having first and second adjacent
ends;
an achor secured to said backing plate;
first spring means urging said first ends into engagement
with said anchor;
brake applying means adapted to move said shoes into
engagement with said drum;
a ratchet wheel rotatably connected to one of said
shoes;
said ratchet wheel having a progressively increasing diameter;
said ratchet wheel being adapted to rotate in a plane
perpendicular to the plane of rotation of said brake
drum;
the second end of said other shoe having a portion engaging the periphery of said ratchet wheel;
second spring means having one end connected to said
other shoe;
means connected to the other end of said second spring
means, to said one shoe and to said ratchet wheel
and constructed to urge said ratchet wheel to rotate;
said second spring means also being constructed to urge
said ratchet wheel to rotate.

5. A brake assembly having a backing plate and a pair of arcuate brake shoes movably connected to said backing plate;
an annular brake drum rotatably disposed with respect
to said brake shoes;
said brake shoes having fist and second adjacent ends;
an anchor secured to said backing plate;
first spring means urging said first ends into engagement with said anchor;
brake applying means adapted to move said shoes into
engagement with said drum;
a ratchet wheel rotatably connected to one of said
shoes;
said ratchet wheel having a progressively increasing
diameter;
the second end of said other shoe having a portion
engaging the periphery of said ratchet wheel;
second spring means having one end connected to said
other shoe;
means connected to the other end of said second spring
means, to said one shoe and to said ratchet wheel
and constructed to urge said ratchet wheel to rotate;
said second spring means also being constructed to urge
said ratchet wheel to rotate;
said second spring means also being constructed to urge
said other shoe into engagement with said ratchet
wheel.

6. A brake assembly having a backing plate and a pair of arcuate brake shoes movably connected to said backing plate;
an annular brake drum rotatably disposed with respect
to said brake shoes;
said shoes having first and second adjacent ends;
an anchor secured to said backing plate;
first spring means urging said first ends into engagement with said anchor;
brake applying means adapted to move said shoes into
engagement with said drum;
a link means interconnecting said second ends;
a ratchet wheel rotatably connected to said link means;
said ratchet wheel having a progressively increasing
diameter;
the second end of said other shoe having a portion engaging the periphery of said ratchet wheel;
second spring means having one end constructed to
urge said ratchet wheel to rotate;
said second spring means also being constructed to urge
said other shoe into engagement with said ratchet
wheel.

7. A brake assembly having a backing plate and a pair of arcuate brake shoes movably connected to said backing plate;
an annular brake drum rotatably disposed with respect
to said brake shoes;
said shoes having first and second adjacent ends;
an anchor secured to said backing plate;
first spring means urging said first ends into engagement with said anchor;
brake applying means adapted to move said shoes into
engagement with said drum;
a link means interconnecting said second ends;
a ratchet wheel rotatably connected to said link means;
said ratchet wheel having a progressively increasing diameter;

said ratchet wheel being adapted to rotate in a plane perpendicular to the plane of rotation of said brake drum;

the second end of said other shoe having a portion engaging the periphery of said ratchet wheel;

a second spring means having one end connected to said other shoe;

lever means connected to the other end of said second spring means and to said one shoe;

flexible means connected to said ever and to said ratchet wheel;

said second spring means exerting a force through said lever means and said ribbon means to urge said ratchet wheel to rotate.

8. A brake assembly having a backing plate and a pair of arcuate brake shoes movably connected to said backing plate;

an annular brake drum rotatably disposed with respect to said brake shoes;

said shoes having first and second adjacent ends;

an anchor secured to said backing plate;

first spring means urging said first ends into engagement with said anchor;

brake applying means adapted to move said shoes into engagement with said drum;

a link means interconnecting said second ends;

a shaft rotatably connected to said link means;

a ratchet wheel nonrotatably mounted on said shaft;

said ratchet wheel having a progressively increasing diameter;

the second end of said other shoe having a portion engaging the periphery of said ratchet wheel;

second spring means having one end connected to said other shoe;

lever means connected to the other end of said second spring means and to said one shoe;

flexible means wound around said shaft and connected to said lever;

said second spring means exerting a force through said lever means and said ribbon means to urge said shaft and said ratchet wheel to rotate.

No references cited.

DUANE A. REGER, *Primary Examiner.*